United States Patent
Chae et al.

(10) Patent No.: US 8,502,997 B2
(45) Date of Patent: Aug. 6, 2013

(54) PRINTING CONTROL APPARATUS AND PRINTING CONTROL METHOD

(75) Inventors: Sung-won Chae, Seoul (KR); Young-hee Huh, Ulsan (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 539 days.

(21) Appl. No.: 12/822,321

(22) Filed: Jun. 24, 2010

(65) Prior Publication Data
US 2011/0134464 A1    Jun. 9, 2011

(30) Foreign Application Priority Data
Dec. 3, 2009  (KR) .......................... 10-2009-118992

(51) Int. Cl.
*G06F 3/12*  (2006.01)
(52) U.S. Cl.
USPC ........................................ 358/1.13; 358/1.15
(58) Field of Classification Search
USPC ............... 358/1.15, 1.13, 403; 715/274, 1.9, 715/700, 713
See application file for complete search history.

(56) References Cited

U.S. PATENT DOCUMENTS

| | | | |
|---|---|---|---|
| 2006/0161559 A1* | 7/2006 | Bordawekar et al. | 707/100 |
| 2008/0178155 A1* | 7/2008 | Gogh et al. | 717/125 |
| 2009/0116063 A1 | 5/2009 | Takashima | |
| 2009/0262396 A1* | 10/2009 | Furuya | 358/1.15 |
| 2009/0290185 A1* | 11/2009 | Shiohara | 358/1.13 |
| 2010/0053668 A1* | 3/2010 | Huh et al. | 358/1.15 |
| 2010/0088594 A1* | 4/2010 | Kim et al. | 715/274 |
| 2010/0122216 A1* | 5/2010 | Song et al. | 715/838 |
| 2011/0109930 A1* | 5/2011 | Eom et al. | 358/1.13 |
| 2011/0134464 A1* | 6/2011 | Chae et al. | 358/1.15 |

FOREIGN PATENT DOCUMENTS

| | | | |
|---|---|---|---|
| JP | 2009-116544 | | 5/2009 |
| JP | 2010140445 | * | 6/2010 |

\* cited by examiner

*Primary Examiner* — Jerome Grant, II
(74) *Attorney, Agent, or Firm* — Stanzione & Kim, LLP

(57) ABSTRACT

A printing control apparatus includes a user interface to display at least one of pre-stored hierarchical printing options if a command to print an XPS file is received, an analysis unit to analyze a hierarchical structure of the XPS file, an applying unit to apply a pre-stored hierarchical printing option selected from among the at least one displayed hierarchical printing options to the hierarchical structure of the XPS file, and a communication interface to transmit the XPS file to which the hierarchical printing option is applied to the image forming apparatus. Therefore, a user can hierarchically set frequently used hierarchical printing options in a convenient manner.

22 Claims, 10 Drawing Sheets

```
XPS Level Favorite

1. XPS_Banner: JOB 1; Doc 1 - Page 3  Doc 2 - Page 2
       -JOB 1 : A4_Banner_Sheet_Draft
         --DOC 1 : Letter_BannerSheet
           ---Page 2 : 3_Copies 2. XPS_Copies : JOB 1 ; Doc 1 - Page 5 ; Doc 2 - Page 3
```

PRINTING CONTROL APPARATUS AND PRINTING CONTROL METHOD

CROSS-REFERENCE TO RELATED APPLICATIONS

This application claims the benefit of priority under 35 U.S.C. §119(a) from Korean Patent Application No. 2009-118992, filed on Dec. 3, 2009, in the Korean Intellectual Property Office, the contents of which are incorporated herein by reference in their entirety.

BACKGROUND OF THE INVENTION

1. Field of the Invention

The present general inventive concept relates to a printing control apparatus and a printing control method, and more particularly, to a printing control apparatus to easily set a hierarchical printing option and a printing control method.

2. Description of the Related Art

Usually, an image forming apparatus refers to a device which prints print data generated by a terminal such as a computer on a printing medium. Such an image forming apparatus may be a copy machine, a printer, a fax machine, or an MFP (multifunction peripheral) which integrates the above functions in one device.

Image forming apparatuses which have been recently introduced include an extensible markup language (XML) paper specification (XPS) emulator and thus support not only print data written in a page description language (PDL) such as a post script (PS) or a printer command language (PCL) but also print data of an XPS file.

An XPS file is an electronic file with a fixed layout which enables a document format to be maintained and a file to be shared. The XPS file refers to a file in which all resources needed for a corresponding document or a corresponding operation are systemized in a directory structure, a reference relationship between the resources is written using an XML, and then all of the data and resources are compressed in a zip format. Such XPS file has a tree structure or hierarchal structure as illustrated in FIG. 9.

Specifically, the XPS file is formed in a hierarchical structure having a job level, a document level, and a page level. Each of the document level and the page level may include a plurality of documents and pages, and different printing options may be applied to each document and page.

A printer driver provides a user interface (UI) through which a printing option is set on a document to be printed. A user may set a printing option regarding various items such as paper size, paper type, paper container, double sided printing, stapler, offset, overlay, watermark, and pages per sheet to be applied to the document using the UI provided by a printer driver.

A user may set a combined printing option by selecting various printing options, and pre-set and pre-store frequently used printing options as favorite printing options.

However, favorite printing options that a conventional printer driver supports cause inconvenience, in that the favorite printing options are applied only when the printing options are set on the entire document, and it is impossible to use the printing options when the printing options are set on each level of an XPS file.

SUMMARY OF THE INVENTION

The present general inventive concept provides a printing control apparatus to easily set a hierarchical printing option and a printing control method.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a printing control apparatus capable of being connected to an image forming apparatus to print an XML paper specification (XPS) file having a hierarchical printing structure, the printing control apparatus including a user interface to display at least one of pre-stored hierarchical printing options if a command to print an XPS file is received, an analysis unit to analyze a hierarchical structure of the XPS file, an applying unit to apply a pre-stored hierarchical printing option selected from among the at least one displayed hierarchical printing option to the hierarchical structure of the XPS file, and a communication interface to transmit the XPS file to which the hierarchical printing option is applied to the image forming apparatus.

The analysis unit may analyze the hierarchical structure by analyzing a print ticket in the XPS file.

The printing control apparatus may further include a determination unit to determine whether the hierarchical printing option selected by a user is applicable to the XPS file or not using the analyzed hierarchical structure of the XPS file.

The determination unit may determine whether the hierarchical printing option selected by a user is applicable to the XPS file or not by determining whether there are areas corresponding to a job area and a document area to which the hierarchical printing option selected by a user is set in the XPS file or not.

The determination unit may determine whether the hierarchical printing option is applicable to the XPS file by determining whether the hierarchical structure of the hierarchical printing option selected by a user is identical to that of the XPS file.

The user interface, if it is determined that the hierarchical printing option selected by a user is not applicable to the XPS file, may display that the hierarchical printing option selected by a user is not valid for the XPS file.

The user interface may inquire whether or not to change the hierarchical printing option selected by a user.

The user interface may display information as to a printing option which is not applicable to the XPS file, among the selected hierarchical printing options.

The user interface may receive a setting of a hierarchical printing option to be set to at least one of a job area, a document area, and a page area of the XPS file, and the printing control apparatus may further include a storage unit to store the set hierarchical printing option as a pre-stored hierarchical printing option.

The user interface may display a printing option pre-stored in the storage unit and receive a setting of the pre-stored printing option for at least one of the job area, the document area, and the page area of the XPS file.

The pre-stored hierarchical printing option may be a favorite printing option to be applied to at least one of the job area, the document area, and the page area of the XPS file.

The foregoing and/or other features and utilities of the present general inventive concept may also be achieved by providing a printing control method of a printing control apparatus connectable to an image forming apparatus which is able to print an XPS file formed in a hierarchical structure, the printing control method including selecting an XPS file to be printed, setting a hierarchical printing option to be set to at least one of a job area, a document area, and a page area of the selected XPS file, applying the set hierarchical printing option to the XPS file, storing the set hierarchical printing option as a pre-stored hierarchical printing option, and transmitting the XPS file to which the hierarchical printing option is applied to the image forming apparatus.

The printing control method may further include determining whether a printing option is pre-stored in the printing control apparatus or not, wherein the setting sets the pre-stored printing option to at least one of the job area, the document area, and the page area of the selected XPS file.

The pre-stored hierarchical printing option may be a favorite printing option to be applied to at least one of the job area, the document area, and the page area of the XPS file.

The foregoing and/or other features and utilities of the present general inventive concept may also be achieved by a printing control method of a printing control apparatus connectable to an image forming apparatus which is able to print an XPS file formed in a hierarchical structure, the printing control method including, if a command to print an XPS file is received, displaying at least one of pre-stored hierarchical printing options, analyzing a hierarchical structure of the XPS file, applying a pre-stored hierarchical printing option selected from among the displayed at least one hierarchical printing option to the hierarchical structure of the XPS file, and transmitting the XPS file to which the hierarchical printing option is applied to the image forming apparatus.

The analyzing may include analyzing the hierarchical structure by analyzing a print ticket in the XPS file.

The printing control method may further include determining whether the selected hierarchical printing option is applicable to the XPS file or not using the analyzed hierarchical structure of the XPS file.

The determining may include determining whether the selected hierarchical printing option is applicable to the XPS file or not by determining whether there are areas corresponding to a job area and a document area to which the selected hierarchical printing option is set in the XPS file or not.

The determining may include whether the hierarchical printing option is applicable to the XPS file by determining whether the hierarchical structure of the selected hierarchical printing option is identical to that of the XPS file.

The printing control method may further include, if it is determined that the selected hierarchical printing option is not applicable to the XPS file, displaying information as to a printing option which is not applicable to the XPS file, among the selected hierarchical printing options.

The printing control method may further include inquiring whether or not to change the selected hierarchical printing option.

The displaying may display the hierarchical printing option including a printing option which is not applicable to the XPS file.

Features and/or utilities of the present general inventive concept may also be realized by a print control apparatus including an XPS print driver to analyze an XPS file-to-be-printed, to compare the XPS file-to-be-printed with pre-stored XPS print settings, to determine whether the pre-stored XPS print settings may be applied to the XPS file-to-be-printed, and, if it is determined that the pre-stored XPS print settings may be applied to the XPS file-to-be-printed, to format the print settings of the XPS file-to-be-printed according to the pre-stored XPS print settings, and a communication interface to transmit the formatted XPS file-to-be-printed to an image forming apparatus.

The XPS file-to-be-printed may have a hierarchal settings format including at least a job level, a document level, and a page level.

The print control apparatus may further include a user interface.

The XPS print driver may output the determination to the user interface and may format the print settings according to a subsequent first input from the user interface.

The print control apparatus may further include a controller, the user interface may display at least one pre-stored print setting, and the controller may transmit the pre-stored print setting to the XPS print driver according to a second input from the user interface.

If it is determined that the pre-stored XPS print settings may not be applied to the XPS file-to-be-printed, the user interface may display adjustable setting information corresponding to the pre-stored XPS print settings, the controller may transmit adjusted setting information to the XPS print driver in response to user input adjusting the adjustable settings, and the XPS print driver may format the print settings of the XPS file-to-be-printed according to the adjusted settings.

Each of the job level print settings, the document level print settings, and the page level print settings may be adjustable.

The print control apparatus may further include memory, and the XPS print driver may include a searching unit to search for pre-stored XPS print settings in the memory.

The user interface may display each pre-stored XPS print setting found in memory. The user interface may include a notification corresponding to each displayed pre-stored print setting that may not be applied to the XPS file-to-be-printed.

The user interface may display only the pre-stored XPS print settings that may be applied to the XPS file-to-be-printed.

Features and/or utilities of the present general inventive concept may also be realized by a print control apparatus including a user interface to display a plurality of hierarchal print settings of an XPS file in response to a print command and to receive a user input to set at least one of the plurality of hierarchal print settings and an XPS print driver to format an XPS file-to-be-printed according to the at least one hierarchal print setting set by the user.

The at least one hierarchal print setting may include a job level print setting, a document level print setting, and a page level print setting.

Features and/or utilities of the present general inventive concept may also be realized by a method of printing an XPS file including determining whether at least one pre-stored XPS print setting corresponding to a plurality of hierarchal levels of an XPS file may be applied to an XPS file-to-be-printed, and, when the at least one pre-stored XPS print setting may be applied to the XPS file-to-be-printed, applying the pre-stored XPS print setting to the XPS file-to-be-printed to set the hierarchal levels of the XPS file-to-be-printed according to the settings of the at least one pre-stored XPS print setting.

The method may further include, after applying the pre-stored XPS print setting to the XPS file-to-be-printed, transmitting the XPS file-to-be-printed to an image forming apparatus.

Determining whether the at least one pre-stored XPS print setting may be applied to the XPS file-to-be-printed may include comparing the hierarchal level characteristics of the XPS file-to-be-printed with the hierarchal level characteristics of the at least one pre-stored XPS print setting.

Comparing the hierarchal level characteristics of the XPS file-to-be-printed with the hierarchal level characteristics of the at least one pre-stored XPS print setting may include determining whether the XPS file-to-be-printed may include a same job, document, and page as the at least one pre-stored XPS print setting.

The method may further include displaying the at least one pre-stored XPS print setting.

The method may further include, when it is determined that the at least one pre-stored XPS print setting may not be applied to the XPS file-to-be-printed, displaying a notice that the at least one pre-stored XPS print setting may not be applied to the XPS file-to-be-printed.

The method may further include, when it is determined that the at least one pre-stored XPS print setting may not be applied to the XPS file-to-be-printed, adjusting the pre-stored XPS print setting and applying the adjusted XPS print setting to the XPS file-to-be-printed.

Adjusting the at least one pre-stored XPS print setting may include displaying the print settings of the plurality of hierarchal levels of the at least one pre-stored XPS print settings and receiving a user input to adjust the displayed print settings.

The method may further include searching for the at least one pre-stored XPS print setting in memory before determining whether at least one pre-stored XPS print setting corresponding to a plurality of hierarchal levels of an XPS file may be applied to an XPS file-to-be-printed.

Features and/or utilities of the present general inventive concept may also be realized by a non-transitory computer-readable medium having stored thereon a computer program to execute a method, the method including determining whether at least one pre-stored XPS print setting corresponding to a plurality of hierarchal levels of an XPS file may be applied to an XPS file-to-be-printed, and when the at least one pre-stored XPS print setting may be applied to the XPS file-to-be-printed, applying the pre-stored XPS print setting to the XPS file-to-be-printed to set the hierarchal levels of the XPS file-to-be-printed according to the settings of the at least one pre-stored XPS print setting.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 2 to 6 are views illustrating a user interface (UI) window according to various exemplary embodiments of the present general inventive concept;

DETAILED DESCRIPTION OF THE PREFERRED EMBODIMENTS

Figure 1:
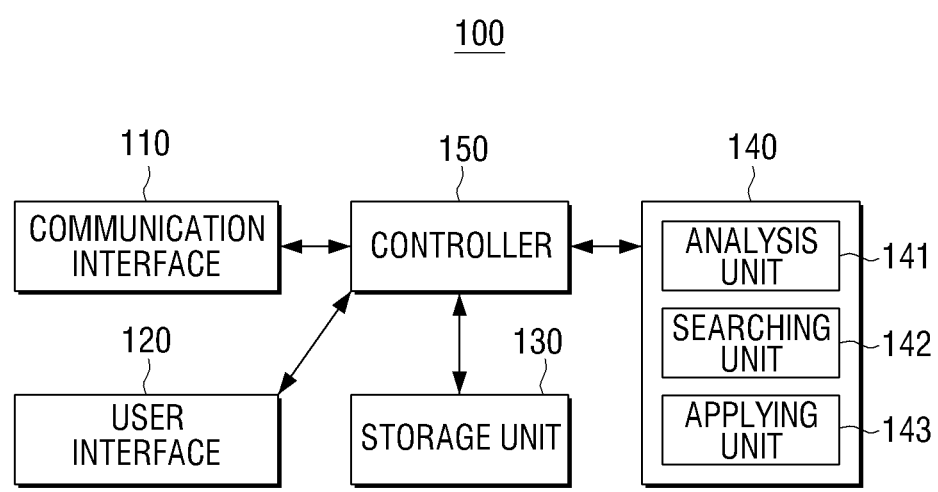
FIG. 1 is a block diagram illustrating a printing control apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a printing control apparatus according to an exemplary embodiment of the present general inventive concept.

Referring to FIG. 1, a printing control apparatus 100 includes a communication interface 110, a user interface 120, a storage unit 130, a driver 140, and a controller 150.

The communication interface 110 transmits an XML paper specification (XPS) file to which a hierarchical printing option is applied to an image forming apparatus (not illustrated). Specifically, the communication interface 110 is connected to the image forming apparatus, and transmits an XPS file to which a hierarchical printing option is applied by the driver 140 which will be explained later to the image forming apparatus. The communication interface 110 is formed to connect the printing control apparatus 100 to an external device, and may be a parallel port, a universal serial bus (USB) port, a wireless module, and so on.

The XPS file means print data of which printing options are set in a tree structure having a plurality of hierarchies. In more detail, the XPS file has a plurality of hierarchies, and a different printing option may be set for each node of each hierarchy and each tree. Each level of the hierarchy may be represented by a PrintTicket, or a representation of an XML document that is used to supply print data to a printer to tell the printer whether to apply various features of the printer to the printed document.

Figure 9:
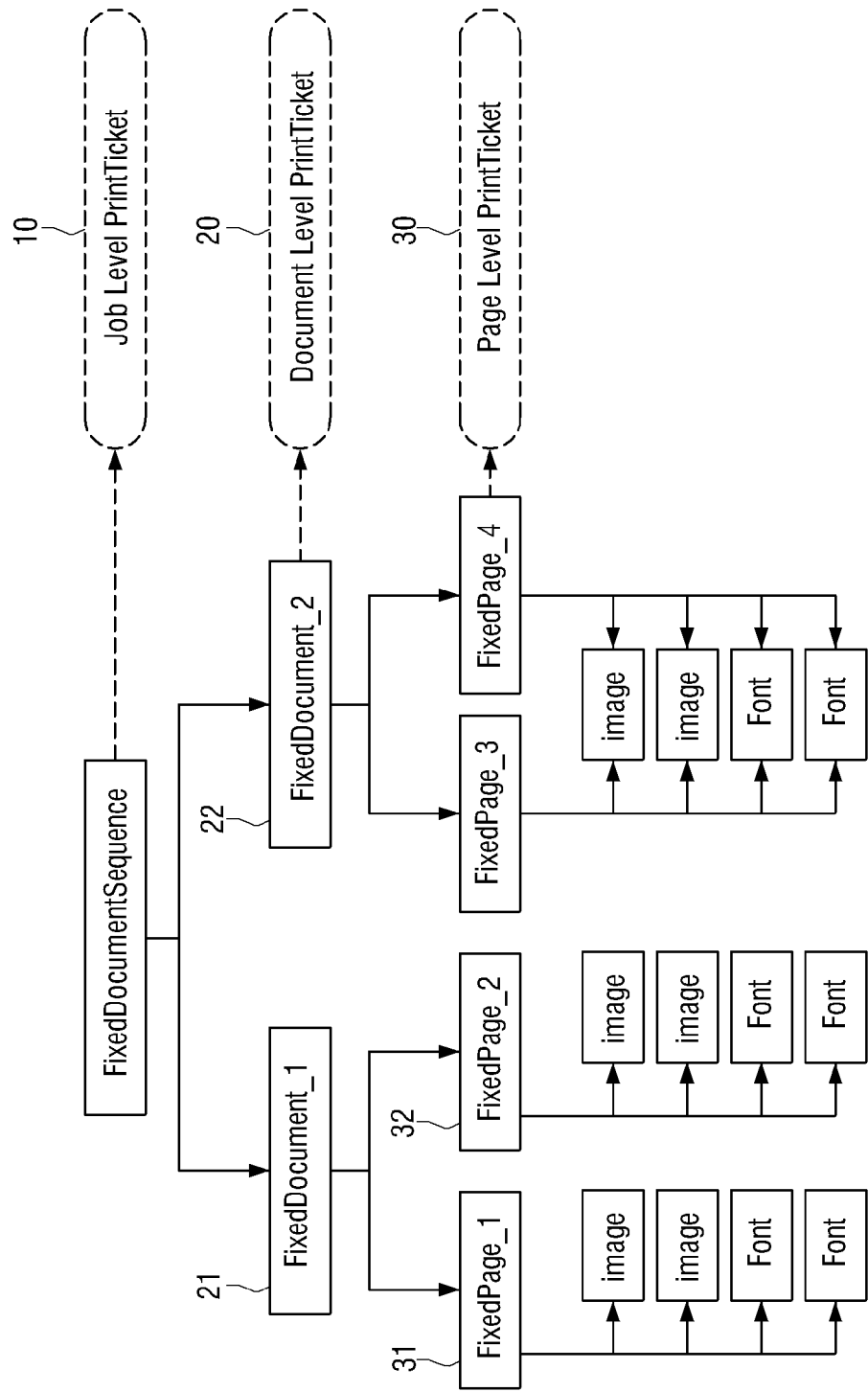
FIG. 9 is a conceptual view provided to explain a logical structure of an XPS file according to an exemplary embodiment of the present general inventive concept.

For instance, the XPS file may be implemented to have three hierarchies including a job level 10, a document level 20, and a page level 30 as illustrated in FIG. 9, and each of printing options for a plurality of documents and a plurality of pages may be set on each of the document level 20 and the page level 30. Specifically, a printing option "double sided printing" is set to the job level 10, a printing option "2-up" is set to the first document 21 of the document level 20, another print option may be applied to the second document 22, a printing option "A4 size" is set to the first page 31 of the first document 21, and a printing option "A5 size" is set to the second page 32 of the first document 21. In this case, the printing options set for each node of a logical structure may be applied to a lower hierarchy as a valid printing option.

The user interface 120 includes a plurality of function keys by which a user sets or selects various functions supported by the printing control apparatus 100, and displays information provided by the printing control apparatus 100. The user interface 120 may be implemented as a device such as a touch pad which supports concurrent input and output, or as a device combining the functions of a mouse and a monitor. A user may select an XPS file on which a printing job will be performed using a user interface (UI) window provided by the user interface 120.

The user interface 120 displays frequently used printing options (that is, favorite printing options, or pre-stored printing options) which are pre-stored in the storage unit 130. In more detail, the user interface 120 displays printing options that a user pre-stores in the storage unit 130, a user may select one of the pre-stored printing options using the user interface 120. The user interface 120 may display only the applicable hierarchical printing options searched by a searching unit 142 to be explained later. Then, if a user selects the hierarchical printing option, the user interface 120 may also display whether the selected hierarchical printing option is valid or not. The user interface 120 may display both the printing options that can be applied to an XPS file and the printing options which cannot be applied to an XPS file among the selected hierarchical printing options.

A pre-stored printing option refers to a single printing option or the combination of a plurality of printing options that a user pre-stores due to frequent use, and includes frequently used and thus pre-stored printing options (referred to below as hierarchical printing option). The hierarchical printing option means a favorite printing option (or a frequently used printing option) which a user sets to at least one of a job area, a document area, and a page area. For example, the hierarchical printing option may be a frequently used printing option set to a job level and a document level, may be a frequently used printing option set to a job level and a page level, and may be a frequently used printing option set to a job level, a document level, and/or a page level. Also, different printing options may be set on different areas of a document level and a page level. The pre-stored printing options can be automatically stored based on how often the options are used in printing operations.

The user interface 120 may display a UI window on which a user sets a printing option to be set to at least one of a job area, a document area, and a page area. The UI window on which a user sets a hierarchical printing option will be explained later with reference to FIGS. 2 to 5. In this situation, if a user sets a printing option to be set to at least one of a job area, a document area, and a page area, the user interface 120 may store the set printing option in the storage unit 130 as a hierarchical printing option.

The storage unit 130 may store an XPS file. In more detail, the storage unit 130 may store an XPS file that a user generates using a lot of application programs. The storage unit 130 may store an XPS file to which a hierarchical printing option is applied by the driver 140 to be explained later. The storage unit 130 may be implemented using not only a storage medium in the printing control terminal 100 but also an external storage medium, a removable disk including a universal serial bus (USB) memory, and a web server via network. The storage unit 130 may store one or multiple XPS files.

The storage unit 130 may store a frequently used printing option. In more detail, the storage unit 130 may store frequently used printing options including a hierarchical printing option.

The driver 140 may convert a document selected by a user into an XPS file, and if the user inputs a command to print the XPS file, the driver 140 may apply the hierarchical printing option selected by the user to the XPS file. The driver 140 includes an analysis unit 141, a searching unit 142, and an applying unit 143.

The analysis unit 141 analyzes a hierarchical structure of an XPS file. Specifically, the analysis unit 141 may analyze the hierarchical structure of an XPS file by analyzing a print ticket in an XPS file.

The searching unit 142 may search for a pre-stored hierarchical printing option which can be applied to the XPS file to be printed. Specifically, the searching unit 142 compares a hierarchical printing option pre-stored in the storage unit 130 with a hierarchical structure of an XPS file using the hierarchical structure of the XPS file analyzed by the analysis unit 141 to search for a pre-stored hierarchical printing option applicable to the current XPS file.

In more detail, the searching unit 142 may search for applicable printing options by determining whether there are areas corresponding to the job area, the document area, and the page area on which a hierarchical printing option pre-stored in the storage unit 130 is set in an XPS file or not. For instance, if the pre-stored hierarchical printing option includes "A4 size" for a job area, "2-up" for the first document of a document level, and "A3 size" for the second page of the first document, the searching unit 142 may determine whether the printing options are applicable or not through whether there is the first document in the XPS file or not and whether there is the second page in the first document or not.

The searching unit 142 may determine whether a hierarchical printing option is applicable by determining whether the hierarchical structure of a hierarchical printing option pre-stored in the storage unit 130 is identical to that of the XPS file to be printed. For example, if the hierarchical printing option pre-stored in the storage unit 130 is for the XPS file having the logical structure illustrated in FIG. 9, the searching unit 142 may determine that the hierarchical printing option is applicable to only the XPS file of FIG. 9, that is the structure of the XPS file analyzed by the analysis unit 141.

The searching unit 142 may determine whether the hierarchical printing option selected by a user is applicable to an XPS file or not. In more detail, the searching unit 142 may search for applicable printing options in advance to displaying a hierarchical printing option, and may determine whether the currently selected hierarchical printing option is applicable or not after a user selects a hierarchical printing option.

The applying unit 143 applies a hierarchical printing option selected by a user to an XPS file. Specifically, the applying unit 143 may set a printing option to a print ticket of an XPS file corresponding to an area to which the hierarchical printing option is applied. For example, if a user selects a hierarchical printing option which includes "A4 size" for a job area, "2-up" for the first document of a document level, and "A3 size" for the second page of the first document, the applying unit 143 sets the printing option "A4 size" to a print ticket of a job level of an XPS file, the printing option "2-up" to a print ticket corresponding to the first document, and the printing option "A3 size" to a print ticket corresponding to the second page.

If the searching unit 142 determines that a pre-stored or favorite printing option setting does not exactly match the XPS file to be printed, the applying unit 143 may apply portions of the pre-stored printing option to the XPS file to be printed. If the XPS file to be printed has fewer documents in a document level or pages in a page level than are described in the print option setting, the applying unit 143 may apply the print option settings to the overlapping document level documents and page level pages, and may disregard to printing options that pertain to additional documents or pages that are not included in the XPS file to be printed. For example, if the print option settings include an "A3 size" paper setting for a first page of a document and an "A4 size" paper setting for a third page of the document, and if the XPS file to be printed includes only two pages in the document, the applying unit 143 may apply the "A3 size" paper setting to the first page of the document and may disregard the "A4 size" paper setting.

The driver 140, including the analysis unit 141, searching unit 142, and applying unit 143, may be stored as a program in a storage media such as a hard disk, memory chip, or other data storage device. The driver 140 may also include hardware elements such as logic circuits, processors, and passive electronic devices to perform the above-described functions and to communicate with the controller 150.

The controller 150 controls each element in the printing control apparatus 100. Specifically, if a printing command is received through the user interface 120, the controller 150 controls the user interface 120 to display a UI window on which a user selects a printing option for an XPS file. In this situation, the controller 150 may control the user interface 120 to display frequently used printing options. In addition, the controller 150 may control the user interface 120 to display only the hierarchical printing option applicable to the current XPS file among the frequently used printing options. The printing control apparatus 100 may be implemented to display all of the pre-store hierarchical printing options including an unavailable hierarchical printing option which cannot be applied to the current XPS file, wherein the unavailable hierarchical printing option is displayed using a predetermined icon.

If a user selects a hierarchical printing option which cannot be applied to the current XPS file, the controller 150 may control the user interface 120 to display a message indicating that the currently selected hierarchical printing option cannot be applied to the current XPS file or to display a UI window through which a user inputs whether or not to change the currently selected hierarchical printing option. In doing so, if a user changes the hierarchical printing option, the controller 150 may control the storage unit 130 to store the changed hierarchical printing option. The controller 150 may store the changed hierarchical printing option in the storage unit 130 under a name selected by a user or a predetermined name.

The controller 150 may control the communication interface 110 to transmit the XPS file to which the selected printing option is applied to the image forming apparatus (not illustrated).

The controller 150 may control the storage unit 130 to store the XPS file to which the driver 140 applies the selected printing option. Since the XPS file is a spool file format and also a document file format, it can be used repeatedly. Therefore, the controller 150 may store an XPS file which the driver 140 has changed. In this situation, the controller 150 may store the XPS file generated by the driver 140 in the storage unit 130 under a file name selected by a user or a predetermined file name. Such operation may be performed according to a selection by a user, or may also be performed automatically without an additional command to store a file.

The controller 150 may control the user interface 120 so that a user sets a hierarchical printing option. In more detail, the controller 150 controls the user interface 120 to display a UI window on which a user sets a printing option to be set to a job level, a printing option to be set to a document area of a document level, and a printing option to be set to a page area of a page level, and controls the storage unit 130 to store the set printing options as a hierarchical printing option. It is preferred that the printing option set by a user is a pre-stored printing option (a frequently used printing option), and this will be explained later with reference to FIG. 3.

The printing control apparatus 100 according to the exemplary embodiment of the present general inventive concept may conveniently set a printing option to an XPS file using a pre-stored hierarchical printing option.

FIGS. 2 to 6 are views illustrating a user interface (UI) window according to various exemplary embodiments of the present general inventive concept.

Figure 2:
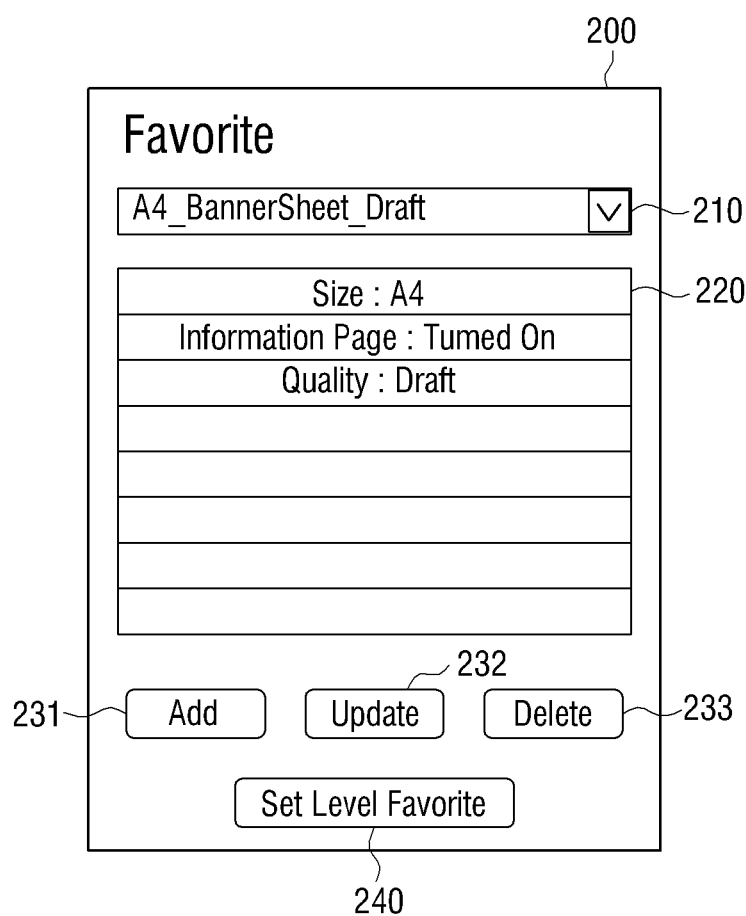

FIG. 2 illustrates a UI window which displays pre-stored printing options according to an exemplary embodiment of the present general inventive concept. Referring to FIG. 2, a UI window 200 includes a name area 210 to display a name of a pre-stored printing option, a display area 220 to display a printing option included in pre-stored printing options, an add area 231 to add a pre-stored printing option, an update area 232 to change a pre-stored printing option, a delete area 233 to delete a pre-stored printing option, and a setting area 240 to set a hierarchical printing option.

The display area 220 displays detailed information included in a pre-stored printing option, and a name of the information is displayed on the name area 210.

The add area 231 is selected when a user desires to add a frequently used printing option, the update area 232 is selected when a user desires to change a pre-stored printing option, and the delete area 233 is selected when a user desires to delete a pre-stored frequently used printing option.

The setting area 240 is selected when a used desires to set a hierarchical printing option. If a user selects the setting area 240, a UI window may be displayed as illustrated in FIG. 3.

Figure 3:
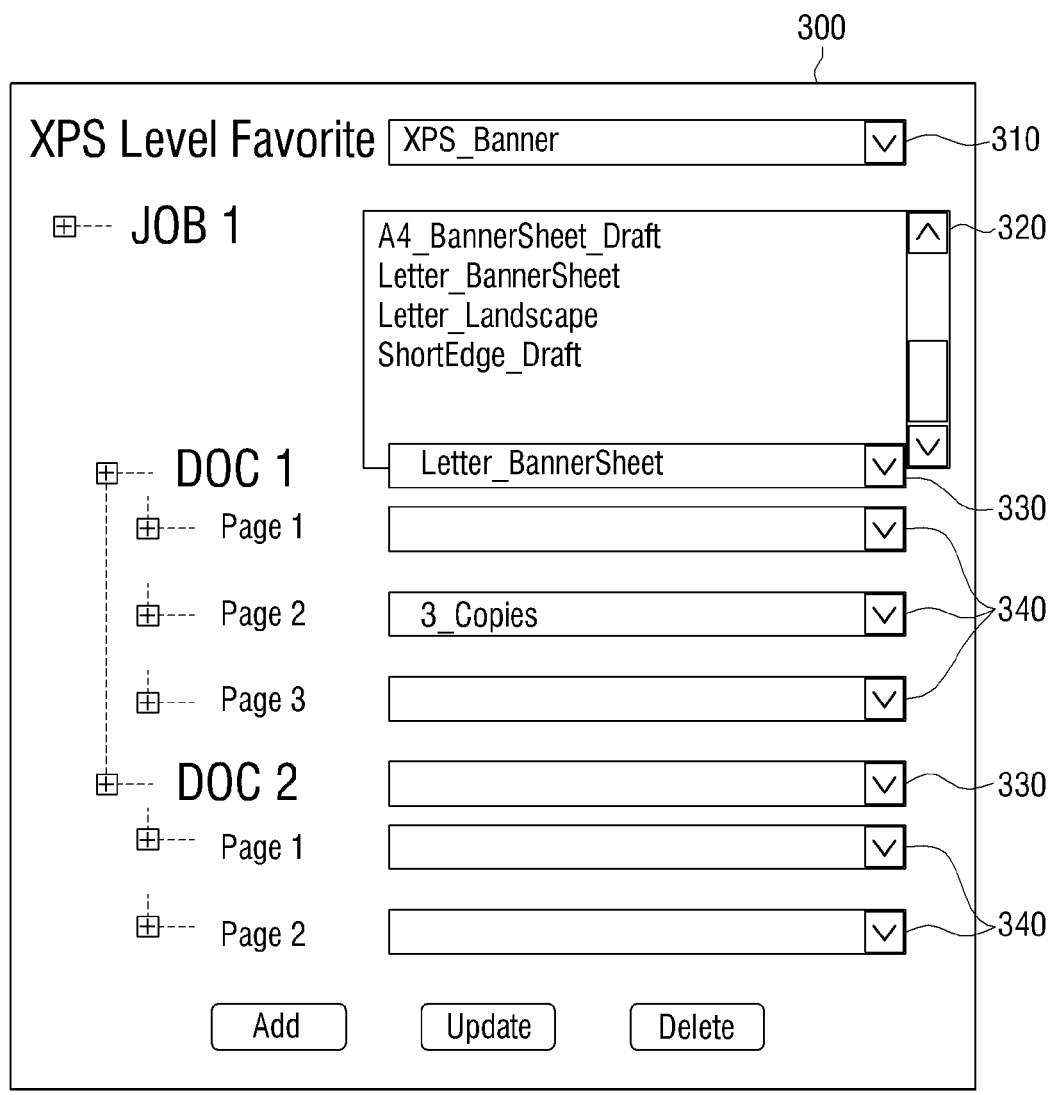

FIG. 3 illustrates a UI window which is displayed when a user selects the setting area 240 of FIG. 2, according to an exemplary embodiment of the present general inventive concept. The UI window 300 includes a name selection area 310 to receive a selection of a name of a hierarchical printing option, a structure display area to display a hierarchical structure (a left portion of a UI window 300) and printing option selection areas 320 to 340 to receive a selection of a printing option capable of being selected by a user.

On the name selection area 310, a user selects or changes a name of a hierarchical printing option. The name of a hierarchical printing option may be input directly by a user or may be automatically generated using a predetermined algorithm. In this situation, a prefix such as "XPS_" may be added to the name of a hierarchical printing option.

The printing option selection areas 320 to 340 may receive a selection of a printing option corresponding to a logical level of an XPS file from a user. In this situation, a user may set a frequently used printing option for each area. If 'A4_BannerSheet_Draft,' 'letter_BannerSheet,' 'Letter_Landscape,' and 'ShortEdge_Draft' are set as frequently used and thus pre-stored printing options as illustrated in FIG. 3, the printing options are displayed and thus a user sets one of the printing options on a corresponding area. A user can set hierarchically a printing option to an XPS file only by selecting a pre-stored printing option on a corresponding area, and thus user's convenience may be enhanced. The printing control apparatus 100 may be embodied to set a printing option other than pre-stored printing options.

Figure 5:
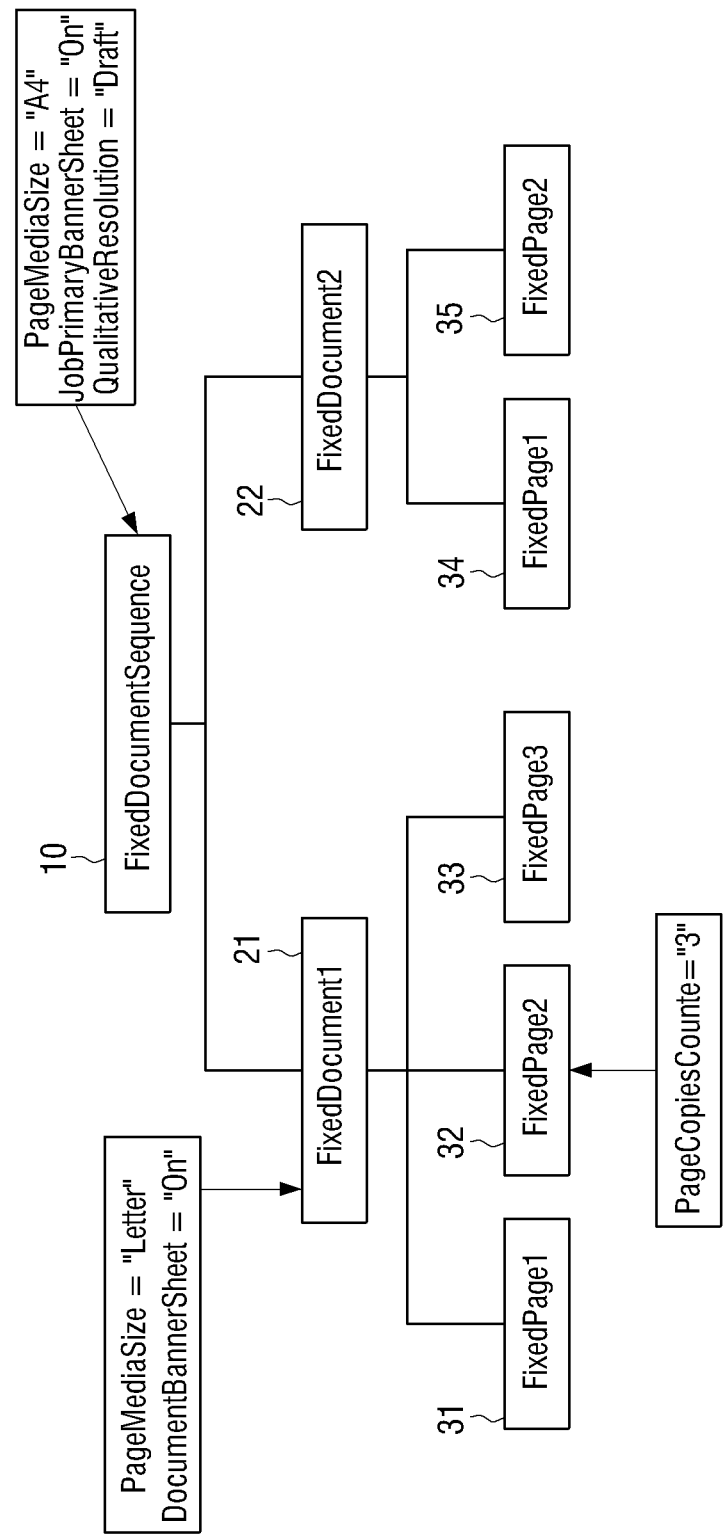

FIGS. 4 and 5 illustrate a UI window 400 which displays a hierarchical printing option set by a user through FIG. 3, according to an exemplary embodiment of the present general inventive concept. Referring to FIG. 4, a user can recognize that two hierarchical printing options are set. Herein, the hierarchical printing option "XPS_Banner" includes the combination of printing options "A4_BannerSheet_Draft" set to a job area 10, the combination of printing options "Letter_BannerSheet" set to the first document 21, and the printing option "3_Copies" set to the second page area 32 of the first document. The printing control apparatus 100 may be embodied to display the set hierarchical printing options in a tree form. The settings of the second document 22, the first and third pages 31 and 33 of the first document 21, and the first and second pages 34 and 35 of the second document are omitted from this description, but may include the same settings as the second page 32 of the first document 21 or different settings.

The exemplary embodiment of setting hierarchical printing options to the structure including two documents is described while FIGS. 3 to 5 are explained. However, the hierarchical printing options may be set to the structure including three or more documents according to a selection of a user, and the number of pages included each document may also be variously changed.

Figure 6:
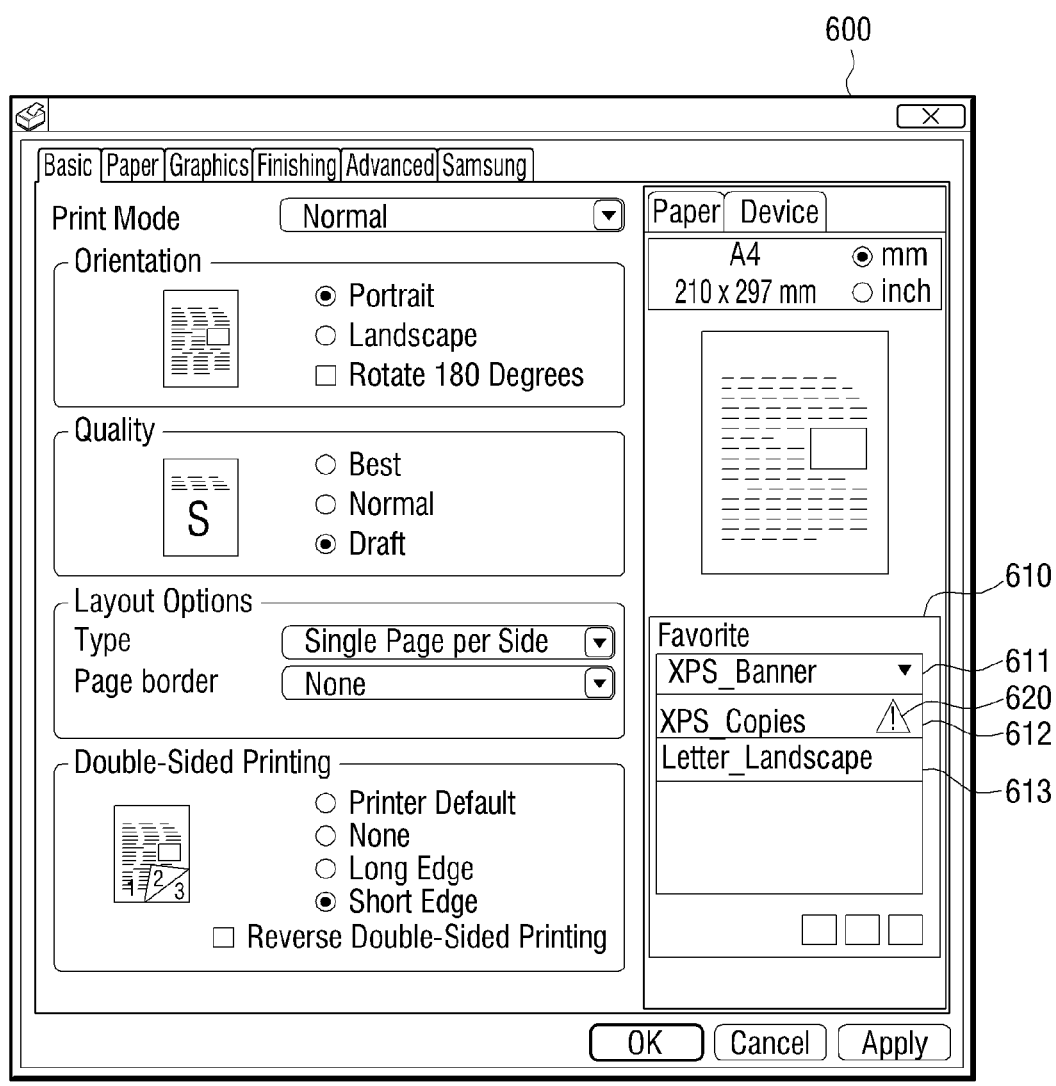

FIG. 6 illustrates a UI window which is displayed to receive a selection of a printing option from a user, according to an exemplary embodiment of the present general inventive concept. Referring to FIG. 6, a UI window 600 includes a favorite printing option display area 610 to display frequently used printing options.

The favorite printing option display area 610 may display pre-stored printing options 611, 612, and 613 in a list form. The printing control apparatus 100 may be embodied to display only the pre-stored printing options which can be applied to a current XPS file, or alternatively to display all of the pre-stored printing options together with a warning icon 620 for an unavailable printing option.

If a user selects a printing option "XPS_Copies" 612, a tooltip to tell a user that the currently selected hierarchical printing option can not be applied to the current XPS file may be displayed, and whether or not to change the currently selected hierarchical printing option may be decided.

If a user commands to change the currently selected hierarchical printing option, a UI window as illustrated in FIG. 3 may be displayed, and the unavailable printing options for the current XPS file may also be displayed so that a user can easily know which printing option needs to be changed.

Figure 7:
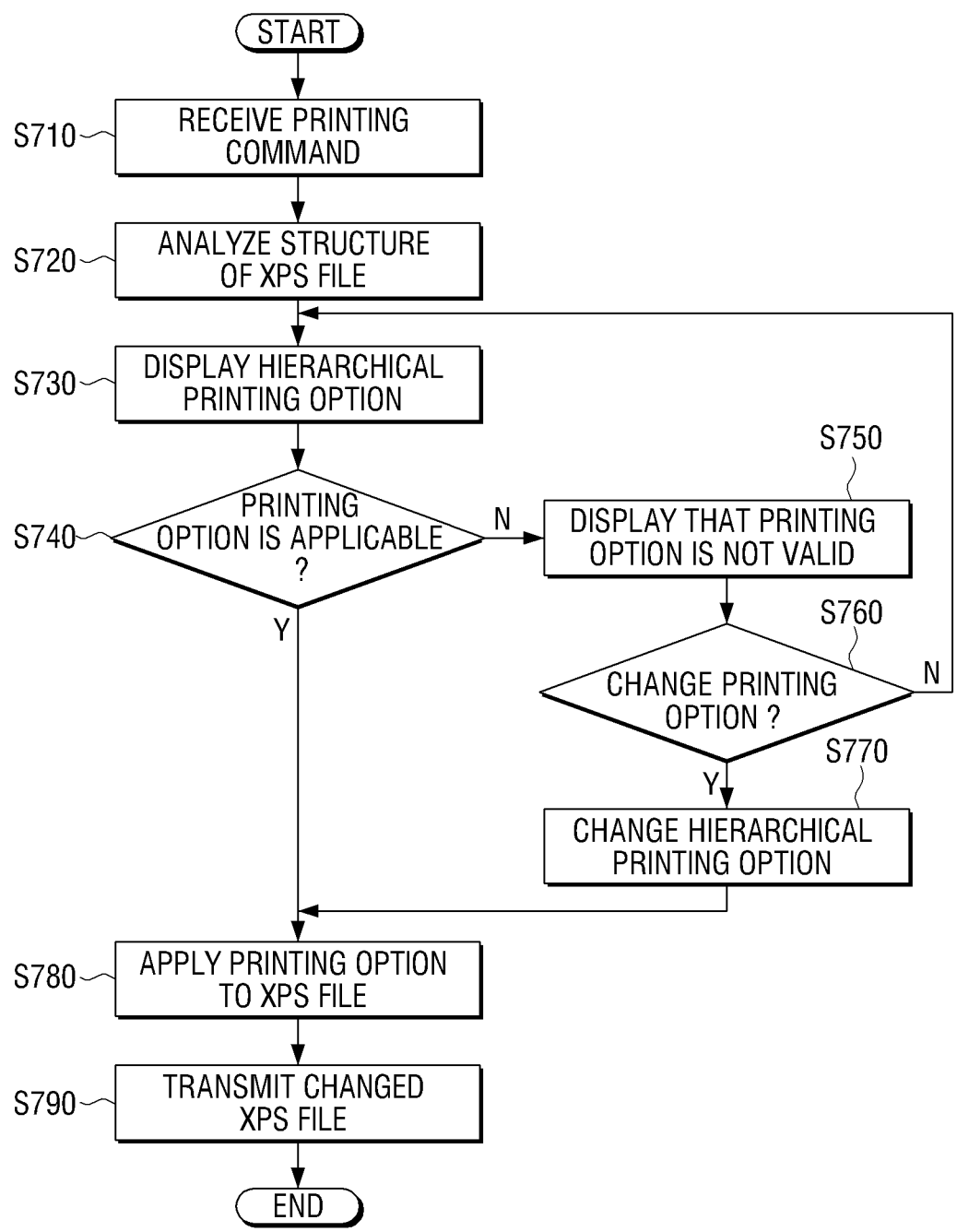
FIG. 7 is a flowchart provided to explain a printing control method according to an exemplary embodiment of the present general inventive concept.

FIG. 7 is a flowchart provided to explain a printing control method according to an exemplary embodiment of the present general inventive concept.

If a command to print an XPS file is received in operation S710, the printing control apparatus analyzes a hierarchical structure of the XPS file in operation S720. In more detail, a command to print an XPS file is received, the printing control apparatus analyzes a print ticket in the XPS file to be printed and thus analyzes a hierarchical structure of the XPS file.

The printing control apparatus displays a pre-stored hierarchical printing option in operation S730. In more detail, the printing control apparatus may display frequently used and thus pre-stored printing options and frequently used hierarchical printing options. In this situation, only the hierarchical printing options which can be applied to the XPS file to be printed may be displayed. Specifically, the printing control apparatus searches for applicable hierarchical printing options by performing operation S740 in advance, and displays the searched hierarchical printing options. The printing control apparatus may be embodied to display all of the pre-stored hierarchical printing options, in which inapplicable printing options are displayed together with a predetermined icon. The operation of setting a pre-stored hierarchical printing option will be explained later with reference to FIG. 8.

The printing control apparatus determines whether the hierarchical printing option selected by a user is applicable to an XPS file or not using the analyzed hierarchical structure of an XPS file in operation S740. In more detail, the printing control apparatus compares a printing option in the analyzed hierarchical structure of the XPS file with the selected hierarchical printing option, and thus determines if the selected hierarchical printing option is applicable to the current XPS file.

In more detail, the printing control apparatus may determine whether the selected printing option is applicable to an XPS file or not by determining whether areas corresponding to a job area and a document area to which the pre-stored hierarchical printing options are applied exist in the XPS file or not. Alternatively, the printing control apparatus may determine whether the selected printing option is applicable to an XPS file by determining whether the hierarchical structure of the pre-stored hierarchical printing option is identical to that of the XPS file to be printed.

If the hierarchical printing option selected by a user is not applicable to an XPS file, the printing control apparatus may display that the selected hierarchical printing option is not valid for the XPS file in operation S750.

The printing control apparatus may inquire a user whether or not to change the selected hierarchical printing option in operation S760. If the user selects changing the hierarchical printing option, the printing control apparatus displays a UI window in operation S770 on which the user changes the hierarchical printing option and thus the hierarchical printing option can be changed. In this situation, the printing control apparatus displays unavailable printing options for the XPS file, among the selected hierarchical printing options, thereby a user conveniently changing the hierarchical printing option.

If the selected printing option is applicable to the XPS file, the printing control apparatus applies the selected printing option to the XPS file in operation S780. Specifically, the selected printing option may be set to a print ticket of an XPS file corresponding to each area to which the hierarchical printing option is applied. For instance, if the selected hierarchical printing option includes "A4 size" for a job area, "2-up" for the first document of a document level, and "A3 size" for the second page of the first document, the printing control apparatus may set the printing option "A4 size" to a print ticket of a job level of an XPS file, the printing option "2-up" to a print ticket corresponding to the first document, and the printing option "A3 size" to a print ticket corresponding to the second page.

The printing control apparatus transmits the XPS file to which the hierarchical printing option is applied to an image forming apparatus in operation S790. The printing control apparatus may store the XPS file to which the hierarchical printing option is applied according to a user's selection and a predetermined option. In this situation, the printing control apparatus may store the XPS file to which the hierarchical printing option is applied under a name selected by a user or a predetermined name.

The printing control method according to the exemplary embodiment of the present general inventive concept may set hierarchically a printing option to an XPS file using a pre-stored hierarchical printing option. The printing control method of FIG. 7 may be performed on the printing control apparatus having the structure illustrated in FIG. 1, and may also be performed on printing control apparatuses formed in other structure.

Figure 8:
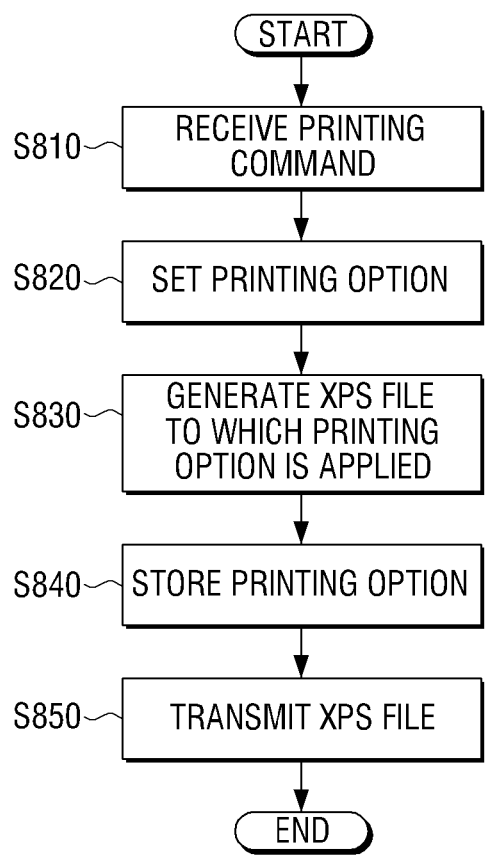
FIG. 8 is a flowchart provided to explain the operation of receiving a setting of pre-stored printing options according to an exemplary embodiment of the present general inventive concept.

FIG. 8 is a flowchart provided to explain the operation of pre-storing a hierarchical printing option according to an exemplary embodiment of the present general inventive concept.

If a user selects an XPS file to be printed, and the printing control apparatus receives a command to print an XPS file in operation S810, a UI window through which a user sets a printing option to be applied to the selected XPS file may be displayed.

If the user sets a hierarchical printing option to be set on at least one of a job area, a document area, and a page area of the selected XPS file through the UI window in operation S820, the printing control apparatus may apply the selected printing options to each area of the XPS file as the hierarchical printing option in operation S830.

The printing control apparatus may store the hierarchical printing option set by a user in operation S840. The stored hierarchical printing option may be used while another XPS file is printed as described above.

The printing control apparatus may transmit the XPS file to which the hierarchical printing option to an image forming apparatus in operation S850.

A user sets a hierarchical printing option while a printing job is performed in this exemplary embodiment of the present general inventive concept, but the printing control apparatus may be implemented to set a hierarchical printing option corresponding to the command without an additional printing command and a selection of an XPS file.

The operation of pre-storing a hierarchical printing option as illustrated in FIG. 8 may be performed on the printing control apparatus illustrated in FIG. 1, and may also be performed on other printing control apparatus.

Figure 10A:
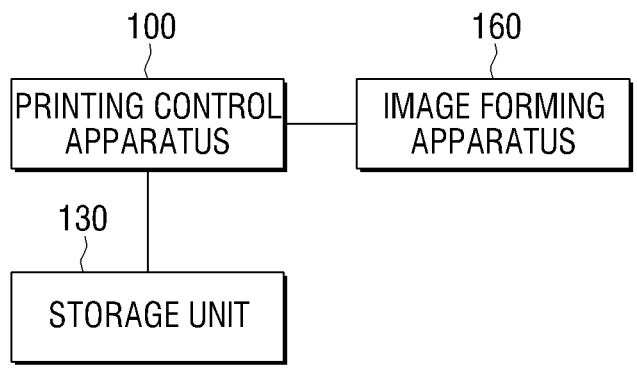
FIGS. 10A and 10B illustrate image forming systems according to embodiments of the present general inventive concept.
Figure 10B:
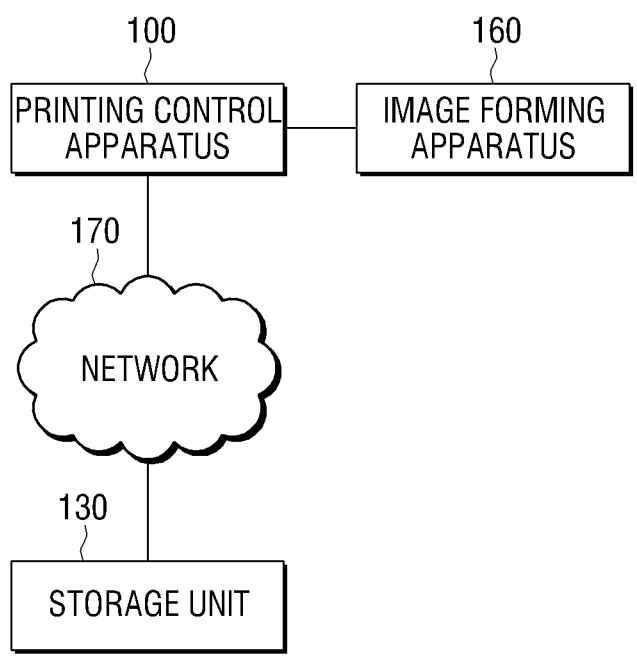

FIGS. 10A and 10B illustrate image forming systems according to embodiments of the present general inventive concept. As illustrated in FIG. 10A, the printing control apparatus 100 may be connected via a wire or wirelessly to an image-forming apparatus 160. The XPS file-to-be-printed may be transmitted via the connection from the print control apparatus 100 to the image-forming apparatus 160. In addition, the storage unit 130 that may store pre-stored XPS file print settings may be an external storage device connected to the printing control apparatus 100.

FIG. 10B illustrates a print control apparatus 100 connected to a storage unit 130 via a network 170, such as the Internet. In such a case, the storage unit 130 may be a web server, a remote storage device, a personal computer, or any other data storage device capable of storing data and transmitting the data via the network 170. For example, an organization such as a company may have stored in remote servers 130 a plurality of XPS print settings that may be accessed by users via the network 170 to print XPS files.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing control apparatus to be connected to an image forming apparatus to print an XML paper specification (XPS) file having a hierarchical printing structure, the printing control apparatus comprising:
   a user interface to display at least one of pre-stored hierarchical printing options if a command to print an XPS file is received;
   an analysis unit to analyze a hierarchical structure of the XPS file;
   an applying unit to apply a pre-stored hierarchical printing option selected from among the at least one displayed hierarchical printing option to the hierarchical structure of the XPS file; and
   a communication interface to transmit the XPS file to which the hierarchical printing option is applied to the image forming apparatus.

2. The printing control apparatus of claim 1, wherein the analysis unit analyzes the hierarchical structure by analyzing a print ticket in the XPS file.

3. The printing control apparatus of claim 1, further comprising:
   a determination unit to determine whether the hierarchical printing option selected by a user is applicable to the XPS file or not using the analyzed hierarchical structure of the XPS file.

4. The printing control apparatus of claim 3, wherein the determination unit determines whether the hierarchical printing option selected by a user is applicable to the XPS file or not by determining whether there are areas corresponding to a job area and a document area to which the hierarchical printing option selected by a user is set in the XPS file or not.

5. The printing control apparatus of claim 3, wherein the determination unit determines whether the hierarchical printing option is applicable to the XPS file by determining whether the hierarchical structure of the hierarchical printing option selected by a user is identical to that of the XPS file.

6. The printing control apparatus of claim 3, wherein the user interface, if it is determined that the hierarchical printing option selected by a user is not applicable to the XPS file, displays that the hierarchical printing option selected by a user is not valid for the XPS file.

7. The printing control apparatus of claim 6, wherein the user interface inquires whether or not to change the hierarchical printing option selected by a user.

8. The printing control apparatus of claim 6, wherein the user interface displays information as to a printing option which is not applicable to the XPS file, among the selected hierarchical printing options.

9. The printing control apparatus of claim 1, wherein:
   the user interface receives a setting of a hierarchical printing option to be set to at least one of a jog area, a document area, and a page area of the XPS file; and
   the printing control apparatus further comprises a storage unit to store the set hierarchical printing option as a pre-stored hierarchical printing option.

10. The printing control apparatus of claim 9, wherein the user interface displays a printing option pre-stored in the storage unit, and receives a setting of the pre-stored printing option for at least one of the job area, the document area, and the page area of the XPS file.

11. The printing control apparatus of claim 1, wherein the pre-stored hierarchical printing option is a favorite printing option to be applied to at least one of the job area, the document area, and the page area of the XPS file.

12. A printing control method of a printing control apparatus connectable to an image forming apparatus which is able to print an XPS file formed in a hierarchical structure, the printing control method comprising:
   selecting an XPS file to be printed;
   setting a hierarchical printing option to be set to at least one of a job area, a document area, and a page area of the selected XPS file;
   applying the set hierarchical printing option to the XPS file;
   storing the set hierarchical printing option as a pre-stored hierarchical printing option; and
   transmitting the XPS file to which the hierarchical printing option is applied to the image forming apparatus.

13. The printing control method of claim 12, further comprising:

determining whether a printing option is pre-stored in the printing control apparatus or not, wherein the setting sets the pre-stored printing option to at least one of the job area, the document area, and the page area of the selected XPS file.

14. The printing control method of claim 12, wherein the pre-stored hierarchical printing option is a favorite printing option to be applied to at least one of the job area, the document area, and the page area of the XPS file.

15. A printing control method of a printing control apparatus connectable to an image forming apparatus which is able to print an XPS file formed in a hierarchical structure, the printing control method comprising:

if a command to print an XPS file is received, displaying at least one of pre-stored hierarchical printing options;

analyzing a hierarchical structure of the XPS file;

applying a pre-stored hierarchical printing option selected from among the displayed at least one hierarchical printing option to the hierarchical structure of the XPS file; and transmitting the XPS file to which the hierarchical printing option is applied to the image forming apparatus.

16. The printing control method of claim 15, wherein the analyzing analyzes the hierarchical structure by analyzing a print ticket in the XPS file.

17. The printing control method of claim 15, further comprising:

determining whether the selected hierarchical printing option is applicable to the XPS file or not using the analyzed hierarchical structure of the XPS file.

18. The printing control method of claim 17, wherein the determining determines whether the selected hierarchical printing option is applicable to the XPS file or not by determining whether there are areas corresponding to a job area and a document area to which the selected hierarchical printing option is set in the XPS file or not.

19. The printing control method of claim 17, wherein the determining determines whether the hierarchical printing option is applicable to the XPS file by determining whether the hierarchical structure of the selected hierarchical printing option is identical to that of the XPS file.

20. The printing control method of claim 17, further comprising:

if it is determined that the selected hierarchical printing option is not applicable to the XPS file, displaying information as to a printing option which is not applicable to the XPS file, among the selected hierarchical printing options.

21. The printing control method of claim 20, further comprising:

inquiring whether or not to change the selected hierarchical printing option.

22. The printing control method of claim 18, wherein the displaying displays the hierarchical printing option including a printing option which is not applicable to the XPS file.

* * * * *